(12) United States Patent
Wu et al.

(10) Patent No.: US 10,331,198 B2
(45) Date of Patent: Jun. 25, 2019

(54) DYNAMICALLY ADAPTING TO DEMAND FOR SERVER COMPUTING RESOURCES

(71) Applicant: Facebook, Inc., Menlo Park, CA (US)

(72) Inventors: Qiang Wu, Foster City, CA (US); Bin Li, Fremont, CA (US); Qingyuan Deng, Bellevue, WA (US); Sachin Kadloor, Palo Alto, CA (US)

(73) Assignee: Facebook, Inc., Menlo Park, CA (US)

( * ) Notice: Subject to any disclaimer, the term of this patent is extended or adjusted under 35 U.S.C. 154(b) by 102 days.

(21) Appl. No.: 15/257,310

(22) Filed: Sep. 6, 2016

(65) Prior Publication Data

US 2017/0192488 A1 Jul. 6, 2017

Related U.S. Application Data

(60) Provisional application No. 62/274,041, filed on Dec. 31, 2015.

(51) Int. Cl.
| | |
|---|---|
| *G06F 1/00* | (2006.01) |
| *G06F 1/26* | (2006.01) |
| *G06F 1/32* | (2019.01) |
| *G06F 1/3287* | (2019.01) |
| *G06F 1/3296* | (2019.01) |
| *G06F 1/3206* | (2019.01) |

(52) U.S. Cl.
CPC .......... *G06F 1/3287* (2013.01); *G06F 1/3206* (2013.01); *G06F 1/3296* (2013.01); *Y02D 10/171* (2018.01); *Y02D 10/172* (2018.01)

(58) Field of Classification Search
CPC ....................................................... G06F 1/32
See application file for complete search history.

(56) References Cited

U.S. PATENT DOCUMENTS

| | | | |
|---|---|---|---|
| 8,566,627 B2 | 10/2013 | Halepete et al. | |
| 2008/0183769 A1* | 7/2008 | Regan | H04L 12/2856 |
| 2011/0289327 A1* | 11/2011 | Nolterieke | G06F 1/26 713/300 |
| 2013/0346774 A1* | 12/2013 | Bhandaru | G06F 1/3234 713/320 |
| 2014/0100706 A1* | 4/2014 | Khatri | G06F 1/3206 700/297 |
| 2014/0258760 A1* | 9/2014 | Wells | G06F 1/3206 713/330 |
| 2015/0006937 A1* | 1/2015 | Rotem | G06F 1/206 713/324 |
| 2016/0006622 A1* | 1/2016 | Bednarz | G06Q 10/0639 370/252 |
| 2016/0048185 A1* | 2/2016 | Liang | G05F 1/66 713/340 |

OTHER PUBLICATIONS

U.S. Appl. No. 15/262,986 by Wu, Q, et al., filed Sep. 12, 2016.

* cited by examiner

*Primary Examiner* — Mohammed H Rehman
(74) *Attorney, Agent, or Firm* — FisherBroyles, LLP

(57) ABSTRACT

Embodiments are described for dynamically responding to demand for server computing resources. The embodiments can monitor performance of each of multiple computing systems in a data center, identify a particular computing system of the multiple computing systems for allocation of additional computing power, determine availability of an additional power supply to allocate to the identified computing system, and selectively enable or disable a turbo mode of processors associated with the computing devices.

15 Claims, 7 Drawing Sheets

DYNAMICALLY ADAPTING TO DEMAND FOR SERVER COMPUTING RESOURCES

CROSS-REFERENCE TO RELATED APPLICATION(S)

This application claims priority to and benefit from U.S. Provisional Patent Application Ser. No. 62/274,041 titled "DYNAMICALLY ADAPTING TO DEMAND FOR SERVER COMPUTING RESOURCES" filed on Dec. 31, 2015, the content of which is incorporated by reference in its entirety herein.

BACKGROUND

Data centers can be subdivided into physical suites, rows, and racks, and electrical power ("power") can be budgeted for each subdivision. A server computing device ("server") is typically a smallest computing unit in a data center. Multiple server computing devices can operate in a rack, which is a vertical collection of server computing devices. Multiple racks can be organized in rows, and multiple rows can be placed in a suite. Each suite can be associated with a main power unit, e.g., a power generation unit. To ensure that adequate power is supplied during a common or peak demand, the power can be "budgeted," meaning that various configuration limits can be placed based on the available power. For example, the number of rows, racks, or servers that are in use at a particular time can be limited based on the available power. The budget may include a surplus allowance, e.g., to respond to unexpected surges in demand for power.

To ensure that the power draw does not exceed a budget for each subdivision, various circuit breakers (CBs) or other overcurrent protective devices (OPDs) may be placed in-line with the power supply. These OPDs can be triggered to switch off power when more power than expected is drawn. The amount of power that is supplied before the OPD is triggered to an off state can be a function of temperature: as temperature increases, the triggering current is reduced.

Servers can also be logically subdivided into "clusters," that can perform tasks jointly or commonly with other servers in the same cluster. For example, data center operators can subdivide servers logically into clusters of application (e.g., "front end" web servers), database servers, caching servers, and so forth. These various "types" of servers may be configured with different hardware and/or software. For example, application servers may be configured with superior class of central processing units (CPUs) but reduced secondary storage space (e.g., hard disk drives, solid state drives, or other data storage devices) as compared to database servers. In contrast, caching servers may be configured with very fast solid state drives with a high amount of capacity. The various components of these different server configurations (e.g., CPU, data storage device, etc.) can consume different amounts of power.

Although data center operators, application developers, database administrators, and others may design a server infrastructure and distribute data in such a way that demand for server computing devices balanced across multiple servers in a cluster, there can be unexpected bursts of demand. As an example, in a social network application, although activity by users can be generally predicted with a reasonable degree of confidence, a burst of activity can occur, e.g., when celebrities post "updates" or otherwise engage with their fans. Failing to respond to such bursts of demand can cause various unintended overall degradation of performance. As an example, if a caching server is negatively impacted by a surge in demand, the performance degradation can impact many other servers and/or applications and services.

The Background section of this document is provided to place embodiments of the disclosed technology in technological and operational context to assist those of skill in the art in understanding their scope and utility. Unless explicitly identified as such, no statement herein is admitted to be prior art merely by its inclusion in the Background section.

BRIEF DESCRIPTION OF THE DRAWINGS

The embodiments may be better understood by referring to the following Detailed Description in conjunction with the accompanying drawings, in which like reference numerals indicate identical or functionally similar elements.

DETAILED DESCRIPTION

Overview

Figure 1:
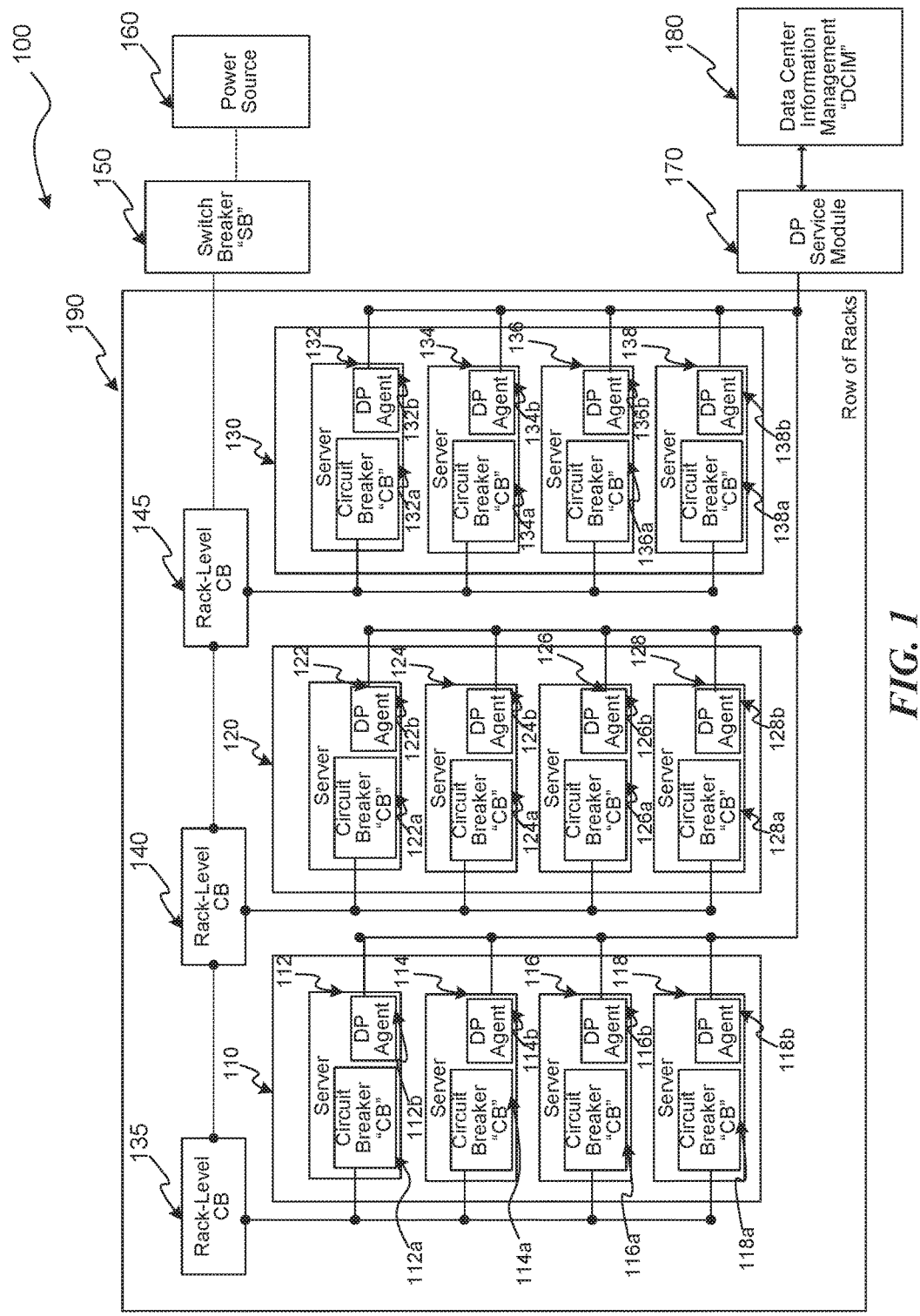
FIG. 1 is a schematic drawing illustrating components of a data center, consistent with various embodiments.

Embodiments are disclosed for observing, reporting, and dynamically managing power and thermal issues in data centers, e.g., at a suite level (or other physical subdivisions of server computing devices) or at a cluster level (or other logical subdivisions of server computing devices). In various embodiments, a dynamic power ("DP") service includes DP agents that execute at data servers being managed by the DP service. A DP agent monitors its associated data servers to determine if the data servers are exceeding performance thresholds, e.g., power consumption, thermal capacity, etc. In various embodiments, the DP service may "poll" the DP agents for performance attributes or DP agents may periodically report the performance attributes. DP agents may execute at servers they manage or at other computing devices. When servers, racks, or other subdivisions are approaching various power or thermal limits, the DP service can selectively command DP agents to reduce power consumption at servers they manage. In various embodiments, the DP service may employ a priority order, e.g., to reduce power demanded by lower priority services so that higher priority services can continue to operate at high levels of performance. As an example, server computing devices ("servers") that provide caching services may continue to operate at a high level of performance whereas servers that back up data may provide lower levels of service. When power demands return to acceptable or lower levels, the DP service may command DP agents to resume their normal behavior. The DP service thus enables data center administrators to provision data centers for an average rather than worst case scenario, and ensure that data center components operate within safe parameters of power and thermal capacities.

Various central processor unit ("CPU") architectures provide "turbo boost" modes. As an example, some Intel® CPU architectures provide a turbo boost mode which, when activated, causes the CPU to execute instructions above its base operating frequency via dynamic control of the CPU's clock rate. The increased clock rate may be limited by the processor's power, current and thermal limits. The DP service may track associations between turbo boost modes and expected electrical power demands and expected thermal changes. When the DP service commands additional computing power, the DP service checks the available electrical power buffer to determine if additional electrical power is available that, if drawn, would not trigger power protection systems, e.g., circuit breakers. The DP service may also check for expected thermal changes. If it is possible to assign additional power to server computing devices without triggering power protection systems, the DP service The DP service assigns the extra computing power to the requested data server(s) when there is sufficient power buffer available to support the additional computing power and when the various power protection systems will not be overloaded by the assignment.

In some embodiments, the DP service assigns the extra computing power by commanding a DP agent (e.g., daemon) executing on one or more of the data servers to turn on the turbo settings associated with the CPU in the data server, where the turbo settings can be tuned to multiple computing performance levels.

In some embodiments, the DP service can track and store historical power usage patterns (e.g., time-of-day loads, etc.), and use this historical power usage patterns to determine whether to assign extra computing power to data servers. For example, if additional computing load is predicted to occur soon, the DP service can decline to supply extra computing power because idle servers are likely to draw additional power.

In various embodiments, the DP service can employ various policies to determine whether and when to employ turbo boost modes. As examples, some servers may always be granted turbo boost mode when there is sufficient power buffer; some servers may never be granted turbo boost mode; and some servers may receive turbo boost mode when needed, e.g., when their performance could be improved. Because utilizing turbo boost mode can cause additional use of power, the DP service can selectively process the policies, e.g., by appropriately commanding the DP agents.

In various embodiments, the DP agents can be commanded by an application programming interface ("API"). The API can provide various methods, e.g., to report current power consumption and/or temperature, increase or decrease power consumption, start or stop turbo boost mode, etc. The DP agents can employ one or more registers or application program interfaces of the CPUs on the servers they manage according to the commands they receive via the API. As an example, some INTEL microprocessors provide a Running Average Power Limit (RAPL) interface that an operating system can use to query for power consumption.

General Description

Various examples of the techniques introduced above will now be described in further detail. The following description provides specific details for a thorough understanding and enabling description of these examples. One skilled in the relevant art will understand, however, that the techniques discussed herein may be practiced without many of these details. Likewise, one skilled in the relevant art will also understand that the techniques can include many other obvious features not described in detail herein. Additionally, some well-known structures or functions may not be shown or described in detail below, so as to avoid unnecessarily obscuring the relevant description.

The terminology used below is to be interpreted in its broadest reasonable manner, even though it is being used in conjunction with a detailed description of certain specific examples of the embodiments. Indeed, certain terms may even be emphasized below; however, any terminology intended to be interpreted in any restricted manner will be overtly and specifically defined as such in this section.

Several embodiments are described in more detail in reference to the Figures. Turning now to Figures, FIG. 1 is a schematic drawing illustrating components of a data center, consistent with various embodiments. Components 100 can include racks 110, 120, and 130 together (possibly with other racks, not illustrated) in a row of racks 190. Each rack can have one or more server computing devices ("servers"), e.g., servers 112, 114, 116, 118, 122, 124, 126, 128, 132, 134, 136, and 138. Servers 112, 114, 116, and 118 are in rack 110, servers 122, 124, 126, and 128, are in rack 120, and servers 132, 134, 136, and 138 are in rack 130. The racks 110, 120, and 130, each have an associated rack-level circuit breaker (CB), e.g., CB 135, CB 140, and CB 145, respectively. Each CB is in-line between its corresponding rack and a power source 160. Each server has its own CB, e.g., CBs 112a, 114a, 116a, 118a, 122a, 124a, 126a, 128a, 132a, 134a, 136a, and 138a corresponding to servers 112, 114, 116, 118, 122, 124, 126, 128, 132, 134, 136, and 138, respectively. Furthermore, a switch breaker (SB) 150 is in-line between the power source 160 and the row of racks 190. As is known in the art, the various SBs and CBs are designed to limit power that is drawn, and can have a power rating or capacity. The power capacity of the CBs and SBs can decrease as temperature increases. Each server 112, 114, 116, 118, 122, 124, 126, 128, 132, 134, 136, and 138 also has associated therewith an adaptive turbo (AT) client, e.g., DP agents 112b, 114b, 116b, 118b, 122b, 124b, 126b, 128b, 132b, 134b, 136b, and 138b corresponding to servers 112, 114, 116, 118, 122, 124, 126, 128, 132, 134, 136, and 138, respectively. The DP agents can be software or hardware components designed to control the power consumption and turbo mode of one or more processors (e.g., central processing units (CPUs) or CPU cores) associated with a corresponding server. The DP agents may be controlled, e.g., via an operating system executing at the servers, to monitor or configure processors associated with their corresponding server, e.g., via an application program interface (API). The components 100 can also include an DP service module and a data center information management (DCIM) controller component 180. The DP service module can communicate with the various DP agents 112b, 114b, 116b, 118b, 122b, 124b, 126b, 128b, 132b, 134b, 136b, and 138b, e.g., to enable or disable turbo mode of their corresponding processors. The DP service module 170 can also exchange data with the DCIM component 180, e.g., to determine how much power is presently being drawn by the various servers, racks, or other data center components, e.g., to determine whether turbo mode can be enabled, which turbo level, and for how many processors. For example, if most servers are operating under low load, high turbo mode and level can be enabled. The higher the level, the more power that is drawn and them more heat that is generated. If, however, most servers are operating under high load, turbo mode may be limited, e.g., by the available power and current temperature.

As would be recognized by one having ordinary skill in the art, functionality provided by the DP Service Module, the DCIM, the DP Agent, or indeed any other component can be centralized or distributed in various embodiments. As an example, the DCIM may be implemented at a server, rack, cluster, or suite level. In various embodiments, to provide additional redundancy, the DP Service Module, the DCIM, the DP Agent may detect failed components and take over functionality previously provided by the failed components.

Figure 2:
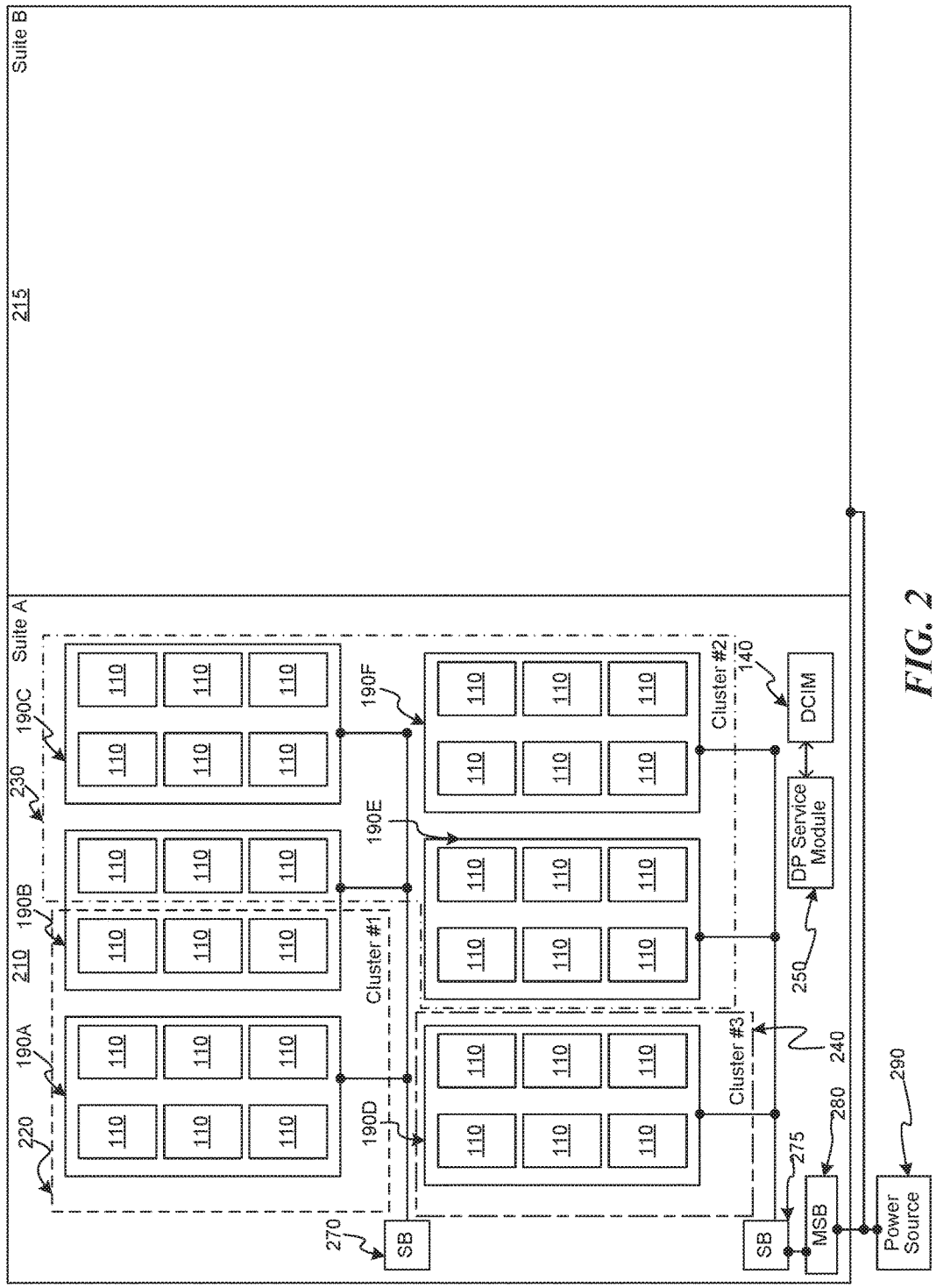
FIG. 2 is a schematic drawing illustrating components of a data center, consistent with various embodiments.

FIG. 2 is a schematic drawing illustrating components of a data center, consistent with various embodiments. The illustrated data center has two "suites," suite A 210 and suite B 220. Additional suites (not illustrated) can also exist. The various suites each draw power from a power source 290, e.g., via an in-line master switch breaker (MSB) 280. In various embodiments, a suite may have one or more MSBs, e.g., based on the available power generation or distribution services available to the suite. The power is then supplied via SBs, e.g., SBs 270 and 275, to one or more rows of racks 190. As described above in relation to FIG. 1, each rack 190 can have associated therewith one or more racks 110. In various embodiments, rows of racks 190, racks 110, or even various servers of each rack (illustrated in FIG. 1) can be logically configured as "clusters." A cluster is a group of servers that can perform tasks jointly or commonly with other servers in the same cluster. In the illustrated example, each cluster is circumscribed by dashed line segments. Cluster #1 (220) includes a full row of racks 190A and shares a half row of racks 190B with cluster #2 (230). Cluster #3 (240) has a single row of racks 190D. Cluster #2 (230) has three full rows of racks 190C, 190E, and 190F, and shares the half row of racks 190B with cluster #1 (220). In various embodiments, clusters may be limited to a single row of racks, multiple full rows or racks, or even a single rack. The DP service Module 250 and the DCIM 140 may together monitor power usage, temperature, and other attributes across the various components of one or more suites, e.g., to determine how much power can be allocated to enable turbo mode on multiple processors.

Figure 3:
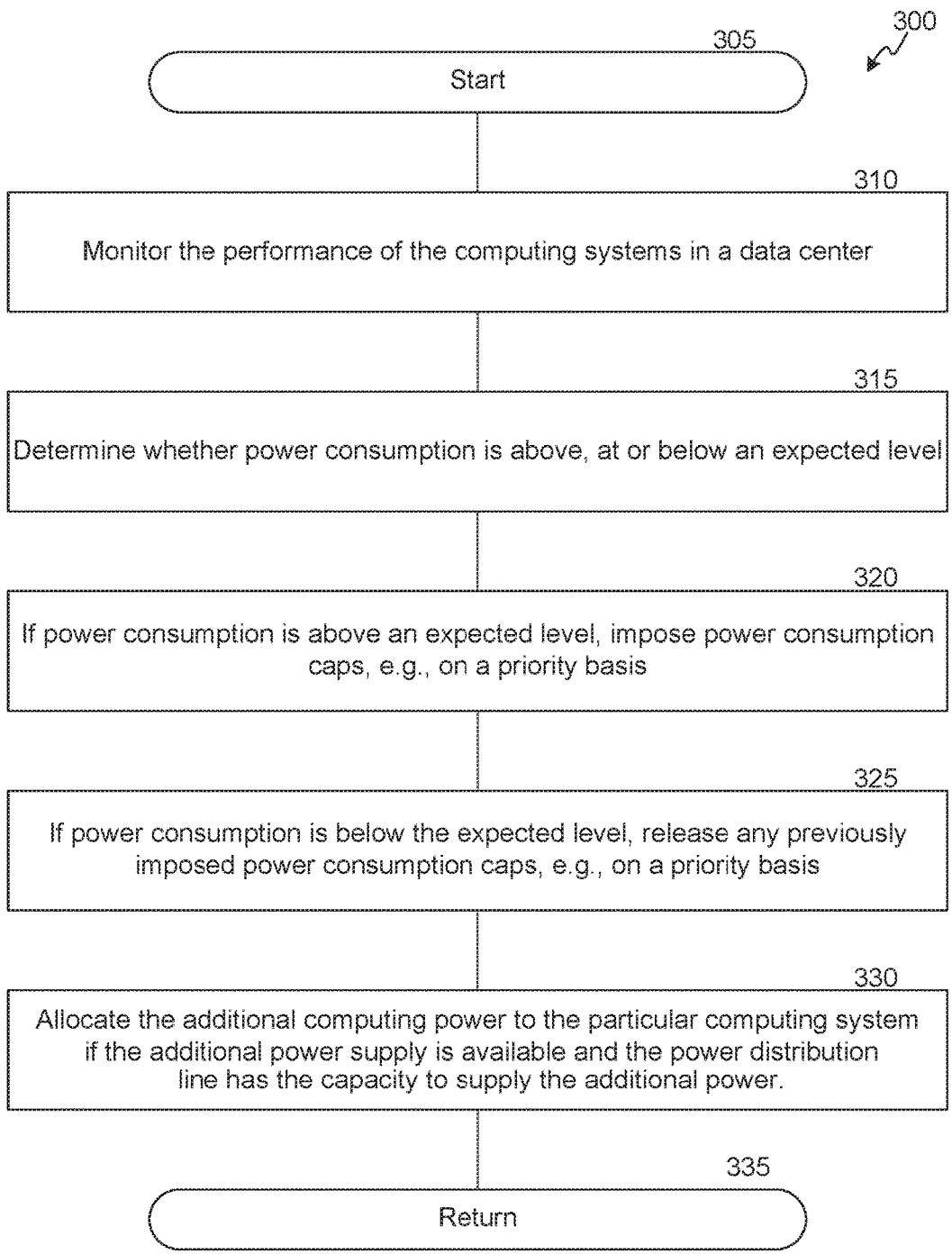
FIG. 3 is a flow diagram illustrating a routine invoked by various embodiments.

FIG. 3 is a flow diagram illustrating a routine 300 invoked by various embodiments, e.g., to identify a computing system that could benefit from enabling turbo mode. The routine 300 begins at block 305. At block 310, the routine 300 monitors the performance of computing systems in a data center. Attributes that are monitored can include, e.g., power consumption, CPU temperature, etc. In various embodiments, power consumption and thermal capacities can be managed across suites, racks, servers, or any other division of components. As an example, the power consumption can be managed across three bands: high, expected, and low. When power consumption exceeds an expected band into a high band, power consumption by some devices may be commanded to be reduced or "capped." When power consumption then falls back to the expected band or below the expected band to the low band, the power consumption caps may be removed. The high band may indicate that some breakers will open, in which case power may be lost to some devices. Alternatively, the bands may indicate that some components may be at risk of thermal overload. At block 315, the routine 300 determines whether power consumption at a managed division of components (e.g., suite, rack, server, cluster, etc.) is above, within, or below the expected band. At block 320, if power consumption is above an expected level, the routine 300 imposes power consumption caps, e.g., on a priority basis. As an example, the priorities may indicate that some services (e.g., web or cache services) cannot reduce power consumption before some other services (e.g., system backup, historical data retrieval, administrative services, etc.) reduce power consumption. At block 325, if power consumption is below the expected level, the routine may release any previously imposed power consumption caps, e.g., on a priority basis. Thus, power consumption can be selectively and gradually reduced and then increased depending on available power and thermal issues.

In various embodiments, the routine 300 determines the availability of electrical capacity on a power distribution line connected to the identified computing system, e.g., to supply the additional required electrical power to the identified computing system. As an example, if too much power is drawn at the computing system, one or more in line CBs may be triggered, which would cause many computing systems to be switched off. At block 330, the routine 300 allocates the additional computing power to the particular computing system if the additional power supply is available and the power distribution line has the capacity to supply the additional power. As an example, if three different turbo mode levels are available, each drawing different amounts of electrical power, the routine 300 may select the turbo mode level that draws a sufficient amount of electrical power that would not trigger one or more of the in-line CBs. At block 335, the routine 300 returns. The routine 300 may manage power consumption and/or turbo mode.

Those skilled in the art will appreciate that the logic illustrated in FIG. 3 and described above, and in each of the flow diagrams discussed below, may be altered in various ways. For example, the order of the logic may be rearranged, substeps may be performed in parallel, illustrated logic may be omitted, other logic may be included, etc.

In various embodiments, the DP Service Module or a DCIM may implement or invoke the routine 300.

Figure 4:
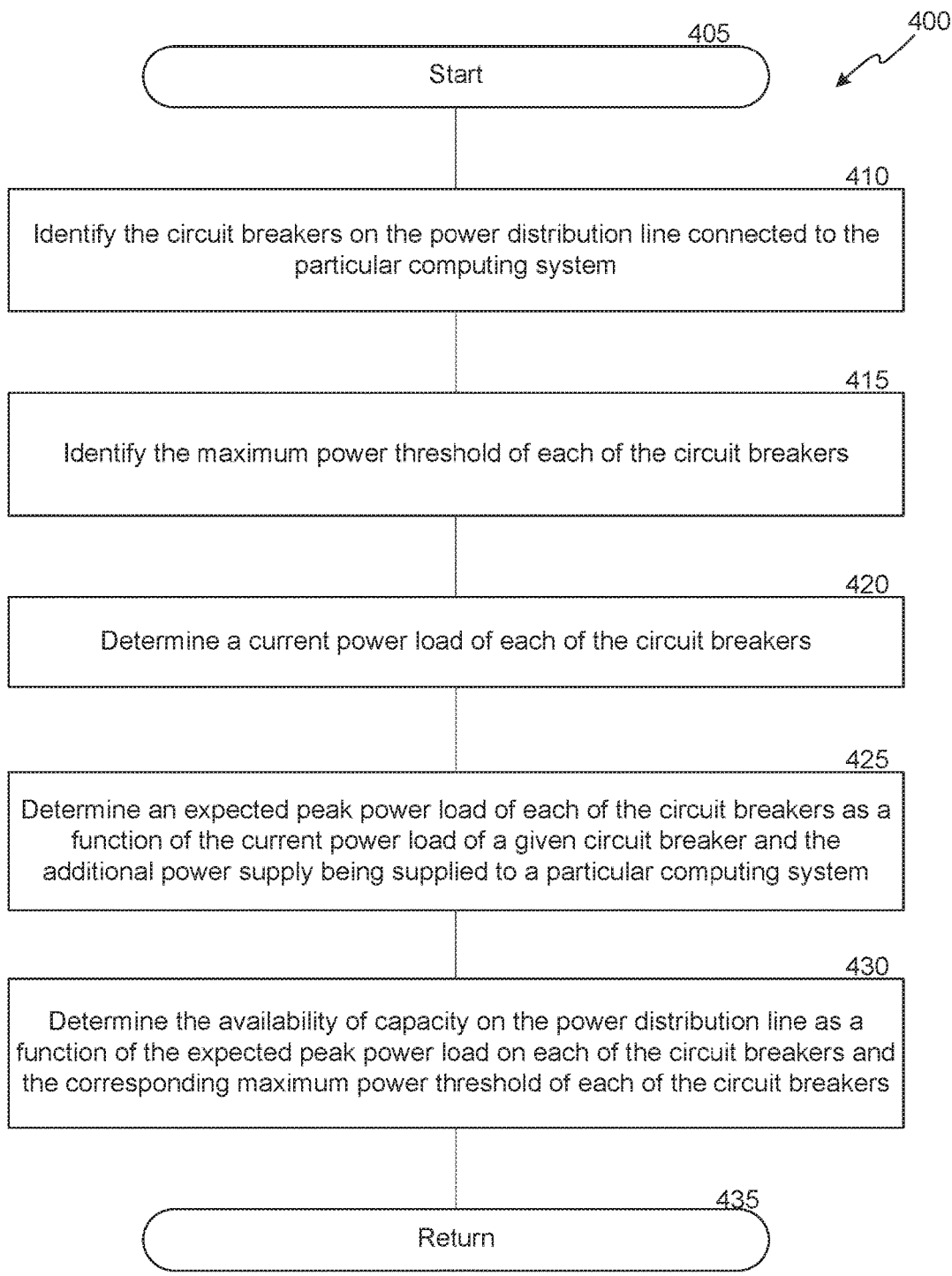
FIG. 4 is a flow diagram illustrating a routine invoked by various embodiments.

FIG. 4 is a flow diagram illustrating a routine 400 invoked by various embodiments, e.g., to determine how much electrical power can be supplied to a computing system identified by the routine of FIG. 3. The routine 400 begins at block 405. At block 410, the routine 400 identifies CBs in-line on the electrical power distribution line connected to an identified computing system (e.g., the computing system identified above in relation to FIG. 5). At block 415, the routine 400 identifies the maximum power threshold of each of the in-line CBs. At block 420, the routine 400 determines a current electrical power load on each of the identified CBs. As an example, the routine can query the DCIM or other components to determine the current power load for other components in-line with the identified computing system. At block 425, the routine 400 determines an expected peak electrical power load of each of the CBs as a function of the current electrical power load of a given CB and the additional power supply being supplied to the identified computing system. At block 430, the routine 400 determines the availability of electrical capacity on the electrical power distribution line as a function of the expected peak electrical power load on each of the CBs and the corresponding maximum electrical power threshold of each of the in-line CBs. At block 435, the routine 400 returns.

In various embodiments, the DP Service Module or a DCIM may implement or invoke the routine 400.

Figure 5:
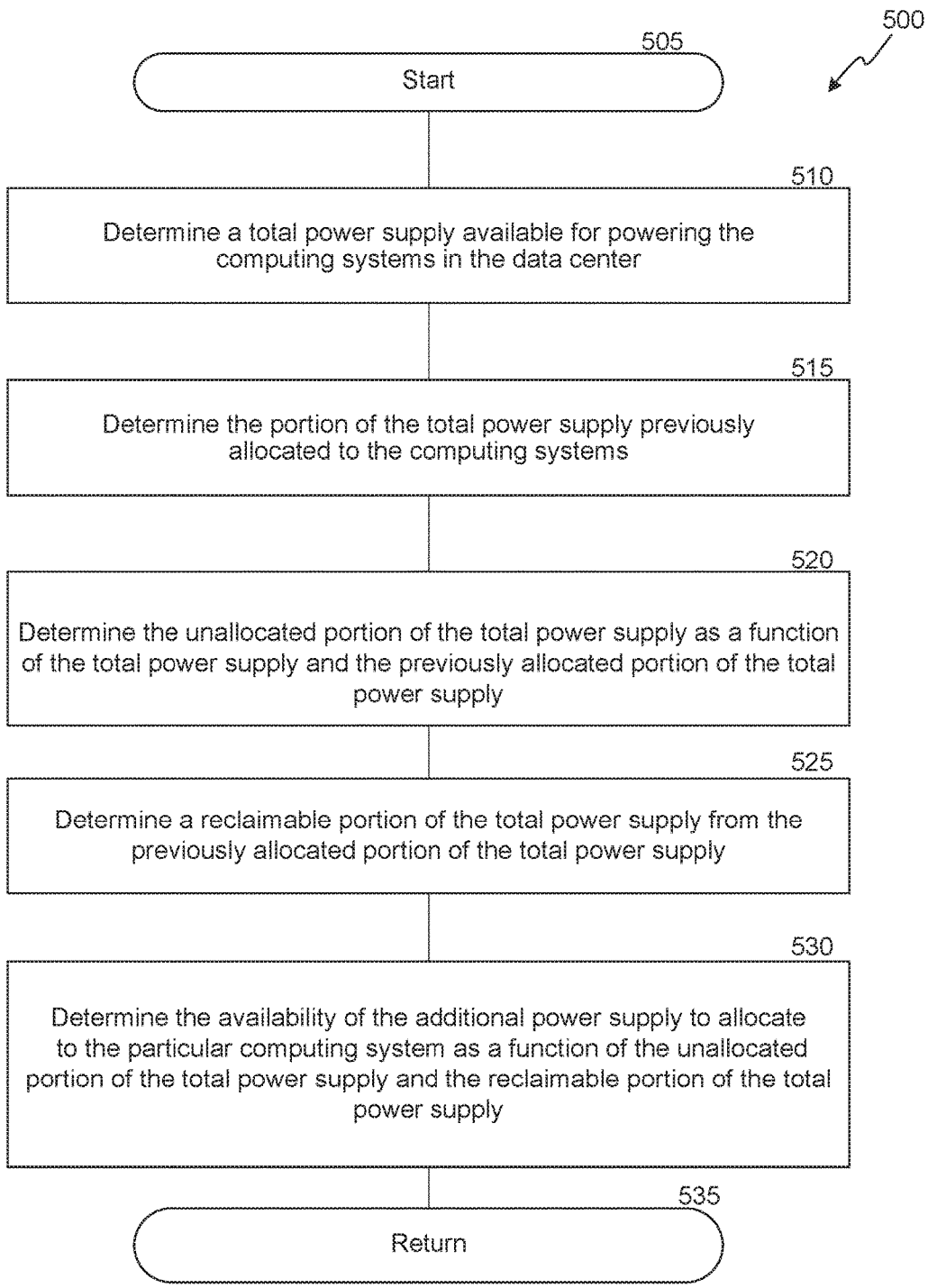
FIG. 5 is a flow diagram illustrating a routine invoked by various embodiments.

FIG. 5 is a flow diagram illustrating a routine 500 invoked by various embodiments, e.g., to reclaim power supply previously provided to an identified computing system. The routine 500 begins at block 505. At block 510, the routine 500 determines a total electrical power supply available for powering the computing systems in the data center. At block 515, the routine 500 determines the portion of the total electrical power supply previously allocated to the computing systems. At block 520, the routine 500 determines the unallocated portion of the total electrical power supply as a function of the total electrical power supply and the previously allocated portion of the total electrical power supply. At block 525, the routine 500 determines a reclaimable portion of the total electrical power supply from the previously allocated portion of the total electrical power supply. At block 530, the routine 500 determines availability of the additional electrical power supply to an identified computing system as a function of the unallocated power of the total electrical power supply and the reclaimable portion of the total electrical power supply. The routine 500 then returns at block 535.

In various embodiments, the DP Service Module or a DCIM may implement or invoke the routine 500.

In various embodiments, servers that are consuming more resources (e.g., power) than expected may be capped before other servers because their increasing power consumption may be a warning that something is amiss.

Figure 6:
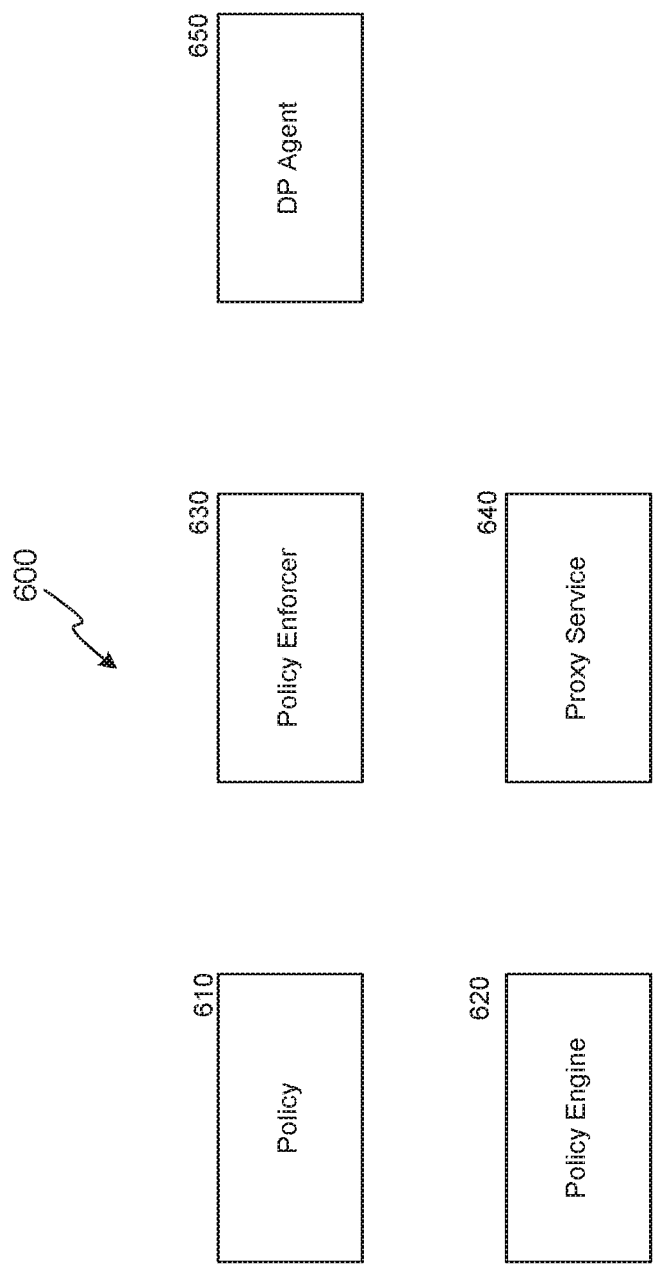
FIG. 6 is a block diagram illustrating a logical distribution of functionality, consistent with various embodiments.

FIG. 6 is a block diagram illustrating a logical distribution of functionality, consistent with various embodiments. In various embodiments, multiple components may be implemented even though a single component is illustrated for simplicity. Multiple components are illustrated, though other components that are not illustrated can function with the illustrated components. A centralized policy 610 can be defined that specifies power consumption and/or turbo policies for any subdivision of computing devices, e.g., server, rack, cluster, suite, etc. As an example, the centralized policy can specify that (a) turbo for a first particular cluster (e.g., ad servers) is to be always on; (b) turbo for a second particular cluster (e.g., administrative servers) is to be always off; and (c) turbo for a third particular cluster (e.g., cache servers) is to be "dynamic." A policy engine 620 can configure the policies, e.g., via an application program interface or user interface.

One or more policy enforcers 630 can enforce the policy, e.g., based on available power. As an example, even though turbo is indicated in the example above to be always on for ad servers, the policy enforcer may communicate with a DP Agent 650 corresponding to one or more ad servers and determine that turbo mode must be temporarily suspended because there is insufficient available power. The policy enforcer 630 may then resume turbo mode when sufficient power becomes available again. The policy enforcers can also proactively increase or decrease available power for various servers, racks, clusters, etc., based on historical needs, e.g., adapted using machine learning techniques.

A proxy service 640 can provide functionality an application program interface and/or user interface to enable application developers to specify a power or turbo configuration for servers they control. As an example, a cache application developer may desire to configure cache servers under their control to improve their performance. They can write software to request the proxy service 640 to increase power to the cache servers they control. The proxy service 640 can then route the request to the appropriate set of servers. The proxy service may also exchange information with one or more policy enforcers 630 to check whether additional power can be supplied; and can exchange information with policy engine 620, e.g., to re-configure policies for the cache servers.

Thus, the system is capable of maximizing performance given various constraints. Turbo mode can be enabled (and concomitant power supplied) when load dictates, additional ad revenue can be generated, etc. The system can adapt dynamically even without user intervention by performing A/B testing, e.g., to supply additional power to a small set of servers to see if performance is improved, and then only supply servers to additional such servers if that is the case. In various embodiments, the system can increase turbo power mode in stages, e.g., to maximize performance given current power constraints.

In various embodiments, DP agents may query services executing on servers they manage, e.g., to determine current performance metrics. As an example, a cache server may respond to queries with a number of cache hits; an ad server may respond with a number of ads served, etc. The system can employ these performance metrics to assist in determining which servers to supply power to (or enable turbo mode for) to maximize overall system performance or revenue generation.

Figure 7:
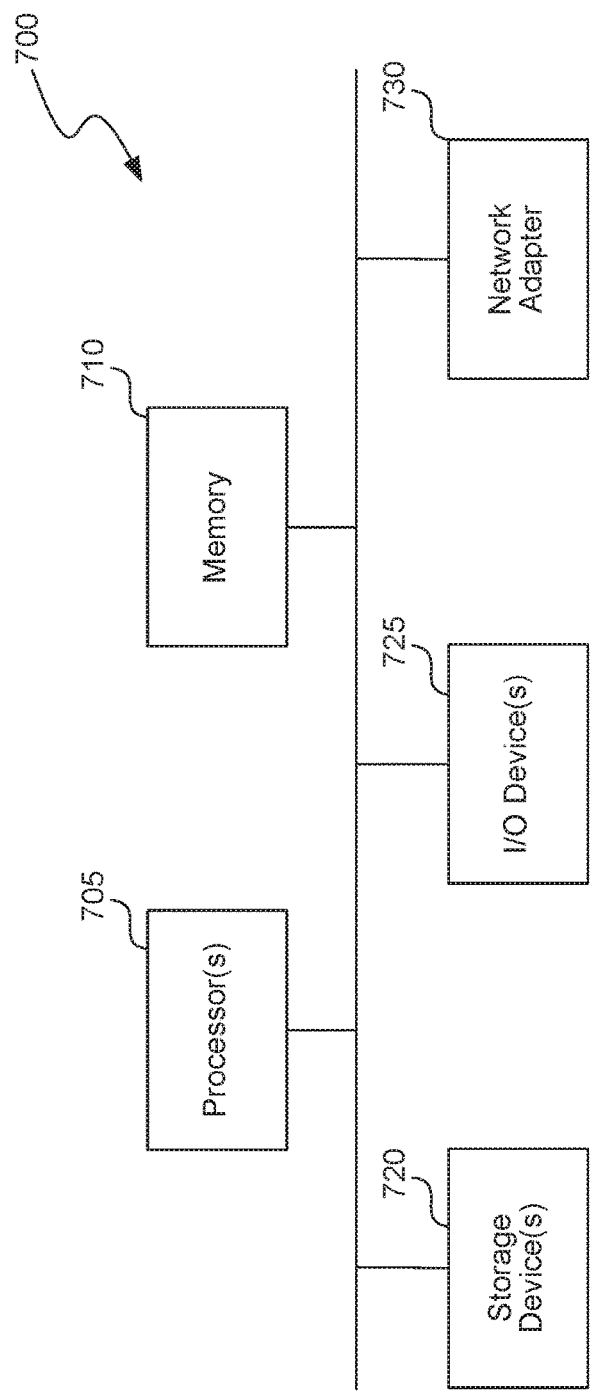
FIG. 7 is a block diagram of a computer system as may be used to implement features of some of the embodiments.

FIG. 7 is a block diagram of a computer system as may be used to implement features of some of the embodiments. The computing system 700 may include one or more central processing units ("processors") 705, memory 710, input/output devices 725 (e.g., keyboard and pointing devices, display devices), storage devices 720 (e.g., disk drives), and network adapters 730 (e.g., network interfaces) that are connected to an interconnect 715. The interconnect 715 is illustrated as an abstraction that represents any one or more separate physical buses, point to point connections, or both connected by appropriate bridges, adapters, or controllers. The interconnect 715, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The memory 710 and storage devices 720 are computer-readable storage media that may store instructions that implement at least portions of the various embodiments. In addition, the data structures and message structures may be stored or transmitted via a data transmission medium, such as a signal on a communications link. Various communications links may be used, such as the Internet, a local area network, a wide area network, or a point-to-point dial-up connection. Thus, computer readable media can include computer-readable storage media (e.g., "non transitory" media) and computer-readable transmission media.

The instructions stored in memory 710 can be implemented as software and/or firmware to program the processor(s) 705 to carry out actions described above. In some embodiments, such software or firmware may be initially provided to the processing system 700 by downloading it from a remote system through the computing system 700 (e.g., via network adapter 730).

The various embodiments introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

Remarks

The above description and drawings are illustrative and are not to be construed as limiting. Numerous specific details are described to provide a thorough understanding of the disclosure. However, in certain instances, well-known details are not described in order to avoid obscuring the description. Further, various modifications may be made without deviating from the scope of the embodiments. Accordingly, the embodiments are not limited except as by the appended claims.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms may on occasion be used interchangeably.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any term discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains.

The headings provided herein are for convenience only and do not necessarily affect the scope or meaning of the claimed embodiments. Further, The drawings have not necessarily been drawn to scale. For example, the dimensions of some of the elements in the figures may be expanded or reduced to help improve the understanding of the embodiments. Similarly, some components and/or operations may be separated into different blocks or combined into a single block for the purposes of discussion of some of the embodiments. Moreover, while the various embodiments are amenable to various modifications and alternative forms, specific embodiments have been shown by way of example in the drawings and are described in detail below. The intention, however, is not to limit the particular embodiments described. On the contrary, the embodiments are intended to cover all modifications, equivalents, and alternatives falling within the scope of the disclosed embodiments as defined by the appended claims.

What is claimed is:

1. A method performed by a controller computing device, comprising:

receiving a policy configuration for a plurality of server computing devices indicating that a turbo mode is to be dynamically configured for processors of the plurality of server computing devices to accommodate a burst of activity, a first cluster of server computing devices of the plurality of server computing devices providing a higher priority service than a second cluster of server computing devices of the plurality of server computing devices;

determining that insufficient power is available for enabling the turbo mode of each of the processors of the plurality of server computing devices;

commanding processors of the first cluster of server computing devices to enable the turbo mode;

commanding processors of the second cluster of server computing devices to disable the turbo mode;

disabling the turbo mode of the processors of the second cluster of server computing devices in an event the turbo mode of the processors of the second cluster of server computing devices causes total power consumption for the plurality of server computing devices to thereafter increase above a specified high threshold; and re-enabling the turbo mode of the processors of the second cluster of server computing devices in an event sufficient power for the turbo mode of the processors of the second cluster of server computing devices again becomes available.

2. The method of claim 1, wherein power values are periodically received from one or more agents of the plurality of server computing devices.

3. The method of claim 1, further comprising commanding an agent to reduce power consumption by its associated computing device to no more than a specified maximum power consumption.

4. The method of claim 3, wherein after the associated computing device has reduced its power consumption, a total power consumption value does not exceed a power budget value managed by the controller computing device.

5. The method of claim 4, further comprising, in an event the total power consumption value falls below a low threshold, commanding the agent to remove the specified maximum power consumption.

6. The method of claim 1, further comprising enabling the turbo mode of the processors of the second cluster of server computing devices in an event the turbo mode of the processors of the second cluster of server computing devices will not cause total power consumption for the plurality of server computing devices to increase above the specified high threshold.

7. A non-transitory computer-readable storage memory, of a computer system having multiple computing devices, each computing device having a processor and memory configured to store instructions, the instructions comprising:

receiving a policy configuration for a plurality of server computing devices indicating that a turbo mode is to be dynamically configured for processors of the plurality of server computing devices to accommodate a burst of activity, a first cluster of server computing devices of the plurality of server computing devices providing a higher priority service than a second cluster of server computing devices of the plurality of server computing devices;

determining that insufficient power is available for enabling the turbo mode of each of the processors of the plurality of server computing devices;

commanding processors of the first cluster of server computing devices to enable the turbo mode;

commanding processors of the second cluster of server computing devices to disable the turbo mode;

disabling the turbo mode of the processors of the second cluster of server computing devices in an event the turbo mode of the processors of the second cluster of server computing devices causes total power consumption for the plurality of server computing devices to thereafter increase above a specified high threshold; and re-enabling the turbo mode of the processors of the second cluster of server computing devices in an event sufficient power for the turbo mode of the processors of the second cluster of server computing devices again becomes available.

8. The computer-readable storage memory of claim 7, wherein the receiving includes invoking an application program interface (API) configured to read from the processors of the plurality of server computing devices their present power consumption.

9. The computer-readable storage memory of claim 8, further comprising invoking an API to enable or disable turbo mode of the processors of the plurality of server computing devices.

10. The computer-readable storage memory of claim 8, wherein the invoking occurs with a specified periodicity.

11. The computer-readable storage memory of claim 10, wherein the periodicity is approximately every three seconds.

12. The computer-readable storage memory of claim 7, wherein the dynamic configuration is based on performance of services executing at the plurality of server computing devices.

13. A system, comprising:
a processor and one or more memories;
a policy for a plurality of server computing devices;
a policy enforcer component configured to:
dynamically configure a turbo mode for processors of the plurality of server computing devices, a first cluster of server computing devices of the plurality of server computing devices providing a higher priority service than a second cluster of server computing devices of the plurality of server computing devices;
determine an availability of sufficient power to enable the turbo mode of each of the processors of the plurality of server computing devices; and
when insufficient power is determined to be available for enabling the turbo mode for each of the processors of the plurality of server computing devices, enable the turbo mode for processors of the first cluster of server computing devices and disable the turbo mode for processors of the second cluster of server computing devices; and
a proxy service component configured to:
receive commands to configure the processors of the plurality of server computing devices;
determine whether sufficient power is available to accordingly configure each of the processors of the plurality of server computing devices; and
decline to configure one or more of the processors of the plurality of server computing devices if insufficient power is determined to be available to configure each of the processors of the plurality of server computing devices.

14. The system of claim 13, further comprising an agent component associated with the plurality of server computing devices and configured to receive configuration commands from the policy enforcer component and accordingly configure one or more of the processors of the plurality of server computing devices.

15. The system of claim 13, wherein power is sufficient if an aggregate set of the plurality of server computing devices is consuming less power than a power budget for the aggregate set of the plurality of server computing devices and enabling a turbo mode will not cause the aggregate set of the plurality of server computing devices to surpass the power budget.

* * * * *